United States Patent [19]
Aoyama

[11] Patent Number: 5,504,850
[45] Date of Patent: Apr. 2, 1996

[54] DATA PROCESSING APPARATUS WITH HEADLINE REPRESENTATION

[75] Inventor: Shinichiro Aoyama, Tokyo, Japan

[73] Assignee: Casio Computer Co., Ltd., Tokyo, Japan

[21] Appl. No.: 345,542

[22] Filed: Nov. 28, 1994

Related U.S. Application Data

[63] Continuation of Ser. No. 126,120, Sep. 23, 1993, abandoned, which is a continuation of Ser. No. 618,044, Nov. 26, 1990, abandoned.

[30] Foreign Application Priority Data

Dec. 14, 1989  [JP]  Japan ..................... 1-322766

[51] Int. Cl.⁶ .......................................... G06F 15/46
[52] U.S. Cl. ................. 395/155; 395/146; 395/147
[58] Field of Search ..................... 395/146, 147, 395/148, 155, 145, 157, 159, 425; 364/900; 340/729

[56] References Cited

U.S. PATENT DOCUMENTS

| | | | |
|---|---|---|---|
| 4,751,674 | 6/1988 | Aoyagi et al. ................. | 364/900 |
| 4,905,185 | 2/1990 | Sakai ............................ | 395/146 |
| 4,939,689 | 6/1990 | Davis et al. .................. | 364/900 |
| 4,962,475 | 10/1990 | Hernandez et al. .......... | 395/146 |
| 4,999,790 | 3/1991 | Murayama .................... | 395/146 |
| 5,001,654 | 3/1991 | Winiger ........................ | 395/148 |
| 5,065,347 | 11/1991 | Pajak et al. .................. | 395/159 |
| 5,150,458 | 9/1992 | Masuzaki et al. ............ | 395/146 |
| 5,165,012 | 11/1992 | Crandall et al. ............. | 395/159 |

OTHER PUBLICATIONS

"Using Microsoft Word" Manual, Microsoft Corporation, Version 5.0, 1983–1989, pp. 206–209.

*Primary Examiner*—Mark R. Powell
*Assistant Examiner*—Ba Huynh
*Attorney, Agent, or Firm*—Frishauf, Holtz, Goodman, Langer & Chick

[57] ABSTRACT

In a data processing apparatus, a specific portion of document data constructed of plural pages, for example, headlines of all pages is displayed within a single display screen. Since a cursor is moved to a certain headline of the document data displayed on the display screen so as to select desired document data, a user can readily find out a desired page within the document data.

5 Claims, 7 Drawing Sheets

: CURSOR

FIG. 5

: CURSOR

FIG. 6

FIG. 7  ▨ : CURSOR

FIG. 8  ▨ : CURSOR

DATA PROCESSING APPARATUS WITH HEADLINE REPRESENTATION

This application is a continuation of application Ser. No. 08/126,120, filed Sep. 23, 1993, abandoned, which is a continuation of Ser. No. 07/618,044, filed Nov. 26, 1990 (abandoned).

BACKGROUND OF THE INVENTION

1. Field of the Invention

The present invention generally relates to a data processing apparatus such as a word processor. More specifically, the present invention is directed to such a data processing apparatus wherein a cursor is moved among certain positions of document data.

2. Description of the Related Art

Generally speaking, in data processing apparatuses such as word processors, by inputting data therein by operating keyboards, there are possibilities that the inputted data have been stored with a plural-page condition because of the data processing methods employed by these data processing apparatus. In accordance with such document data processing apparatuses for processing document data, the cursor must be frequently moved to desirable positions within the document data constructed of plural pages in order to display editing positions of the document data.

There are provided the following keys for moving the cursor on the conventional keyboards. That is, a cursor movement key is first employed so as to move the cursor in any of up/down/right/left directions by one character unit. Secondly, a line head/line end key is provided for moving the cursor to a line head or a line end of the same one line. Thirdly, a sentence head/sentence end key is employed so as to move the cursor to a sentence head and a sentence end of the inputted data within plural pages. Fourthly, there is provided a page head/page end key for moving the cursor to a page head and a page end within the same page. Fifthly, a page/line/column calling key is employed for moving the cursor position by inputting a page, line and column for a designation purpose. Sixthly, there is further a preceding/succeeding screen calling key for moving the cursor to a sentence head of a preceding screen or a succeeding screen.

In the conventional data processing apparatuses, the cursor can be moved and displayed at the desired position of the document by operating the above-described first to sixth keys.

However, particularly when the cursor is moved to desired positions of the document data constructed of plural pages, cumbersome key operations are necessarily required and therefore a lengthy operation time is needed in such a conventional cursor moving method. In other words, when the cursor is moved from a certain page which is different from such a page that specific document data is present therein, to a position of this specific data among the document data constructed of plural pages during the document editing operation, the contents of the document must be confirmed every page in order to grasp the position of the specific document data. Even when any one of the above-described various cursor moving keys is manipulated, a lengthy time is necessarily required so as to move the cursor to the page in which the specific document data has been held.

Furthermore, to sequentially move a cursor from a head of a document toward an end thereof, since the content of the display buffer is rewritten every time the cursor movement key is operated, a time required for rewriting the content of the display buffer is additionally needed.

SUMMARY OF THE INVENTION

An object of the present invention is to provide a data processing apparatus capable of easily confirming a page containing specific data from input data and also of quickly moving a cursor to this page.

To achieve the above-described object, a data processing apparatus according to the present invention comprises:

storage means for storing data constructed of plural pages;

display means for displaying the data stored in said storage means;

list-representation controlling means for reading out data on a predetermined portion of each page within the data stored in said storage means so as to be displayed as a list representation together with a cursor on said display means;

page designating means for designating a desirable page by moving said cursor within the list representation displayed on said display means; and designated-page display controlling means for reading out data on the page designated by said page designating means from said storage means so as to be displayed on said display means.

In accordance with the data processing apparatus of the present invention, easy confirmation can be made of a page containing therein specific data from data constructed of plural pages, and also the cursor can be readily and quickly moved to this page containing such specific data.

BRIEF DESCRIPTION OF THE DRAWINGS

The above-described purpose and other useful and novel features of the present invention will become more readily apparent in the following description of the accompanying drawings, in which.

DETAILED DESCRIPTION OF THE PREFERRED EMBODIMENTS

Referring now to FIGS. 1 through 8, a data processing apparatus according to a fist preferred embodiment of the present invention will be described.

Figure 1:
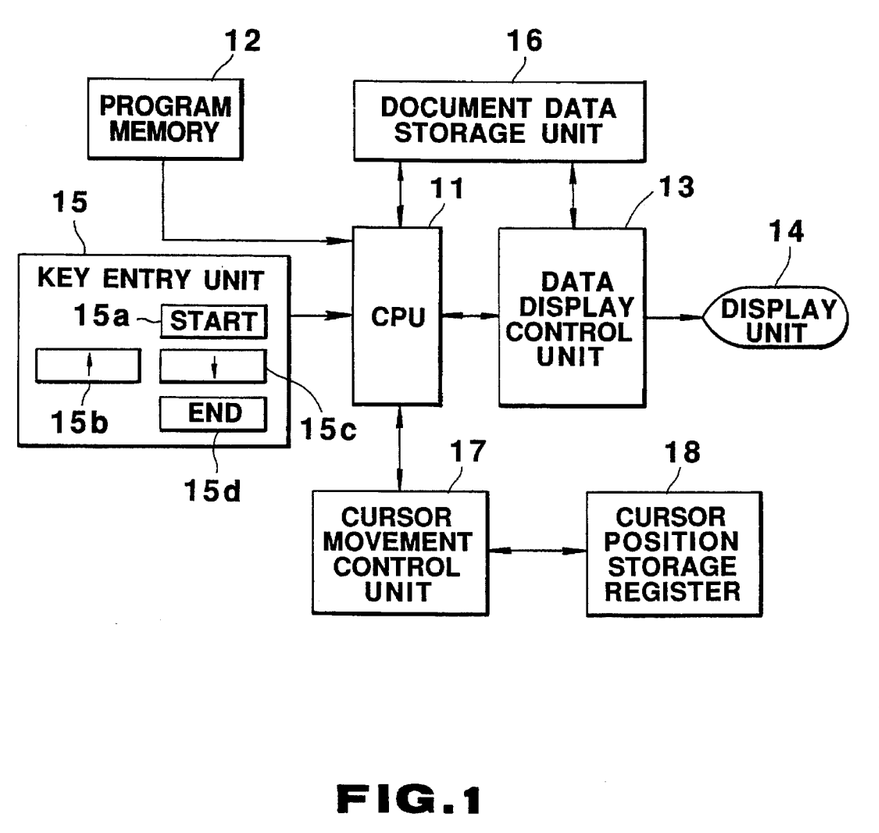
FIG. 1 is a schematic block diagram of an overall construction of a data processing apparatus according to a first preferred embodiment of the present invention.

FIG. 1 is a schematic block diagram of a construction of the data processing apparatus according to the first preferred embodiment of the present invention. In this data processing apparatus, a central processing unit (CPU) 11 has a function to control an overall operation of this data processing apparatus. A program memory 12 is employed and is arranged by a read-only memory (ROM) for previously storing a controlling program to operate the CPU 11. A data display control unit 13 is operated in response to a control signal supplied from the CPU 11, and stores display data which is to be displayed on a display unit 14 such as a cathode-ray tube (CRT), and is furnished to the display unit 14.

A key entry unit 15 includes a start key 15a for a list of document representation; a key 15b for moving a cursor in an upper direction; a key 15c for moving a cursor in a lower direction; and an end key 15d and the like. In response to the key operations, the key entry unit 15 supplies a key input signal to the CPU 11.

A document data memory unit 16 stores therein document data inputted from the key entry unit 15 under control of the CPU 11. A cursor movement control circuit 17 is connected to both the CPU and a cursor position storage register 18, and rewrites and also reads the contents of the cursor position storage register 18 in response to various data sent from the CPU 11 in accordance with the key operations by the key entry unit 15.

Figure 2:
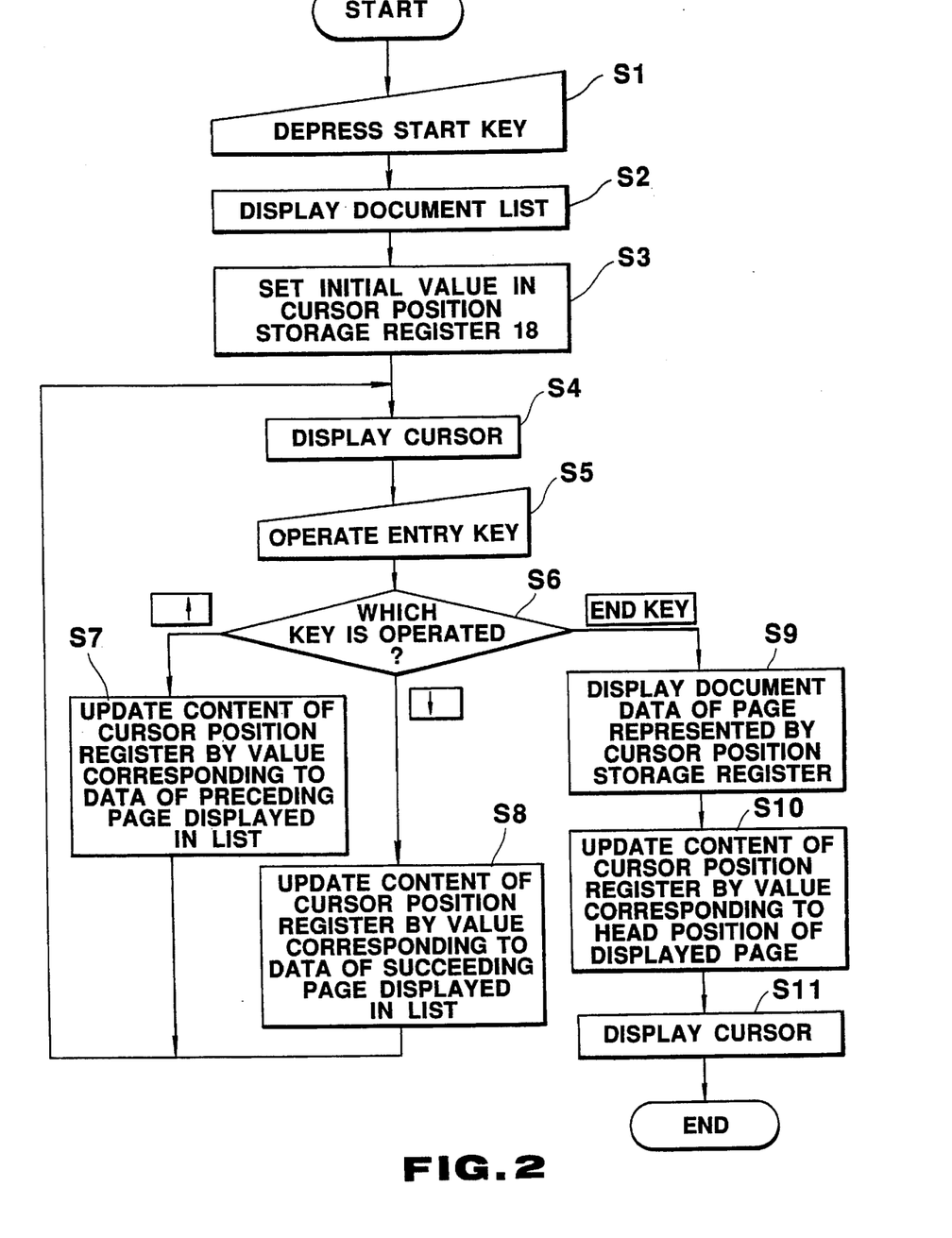
FIG. 2 is a flow chart for explaining operations of the data processing apparatus shown in FIG. 1.

Overall operation of the first data processing apparatus with the above-described arrangement shown in FIG. 1 will now be described with reference to a flow chart shown in FIG. 2. It should be noted that document data have previously been formed and stored in the document data storage unit 16.

To initiate a data processing operation, when the start key 15a provided on the key entry unit 15 is depressed (Step S1), the document data is read out from the document data storage unit 16 and written into the data display control unit 13 by the CPU 11 in response to the control program previously stored in the program memory 12. It should be noted that the document data to be stored into the data display control unit 13 corresponds to such data constructed of headlines for the respective pages.

Figure 3:
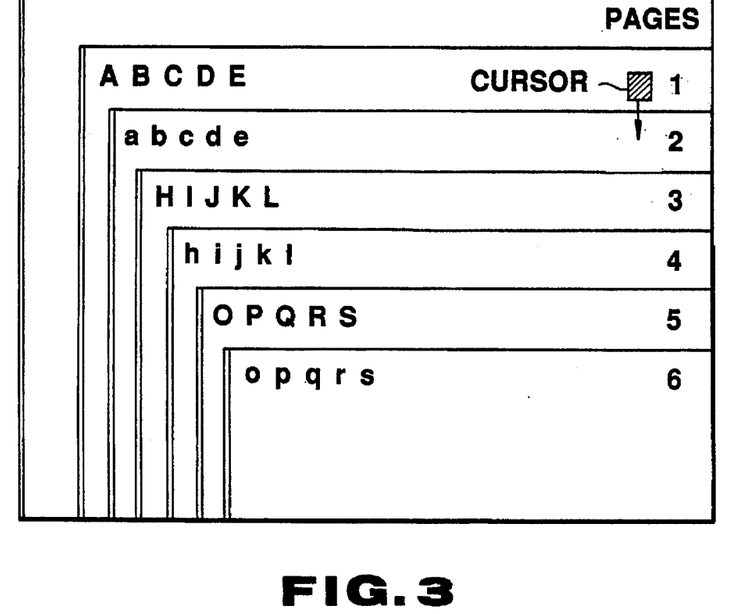
FIG. 3 illustrates an example of a display for a list of document according to the first preferred embodiment of the present invention.

Accordingly, a list of document is displayed on a screen of the display unit 14, as represented in FIG. 3. Each page of the document data which has been inputted as plural pages is displayed in such a manner that one line of each head sentence (for instance, A B C D E F) is represented as a headline together with a page number.

When an operator observes this document list, he may substantially specify a page at which a position of desirable specific document data appears (Step S2).

Subsequently, an initial value is set by the cursor movement control unit 17 into the cursor position storage register 18 (Step S3). As a result, a cursor is displayed on the display unit 14, which designates a page number of the document list and is positioned near the number indicative of this page number, as represented in FIG. 3 (Step S4).

Under this condition, when the key entry operation is made by the key entry unit 15 (Step S5), a judgement is made which key of the key entry unit 15 is depressed (S6). If the key 15b for moving the cursor in the upper direction is depressed, the storage content of the cursor position storage register 18 is updated by a value for designating a preceding page of a page designated by the present cursor position (Step S7), whereas when the key 15c for moving the cursor in the lower direction is depressed the storage content thereof is updated by another value for designating a succeeding page (Step S8). Then, returning back to the previous Step S4, when the cursor display operation is performed, the cursor is moved to a page which is designated by a value stored into the cursor position storage register 18.

If another check is made in the previous Step S6 whether or not the end key 15d is manipulated, it is judged that the page designation has been completed. Accordingly, the CPU 11 calls the document data of the page designated by the position data which has been stored into the cursor position storage register 18 from the document data storage unit 16, and stores this document data into the data display control unit 13 so as to be displayed on the screen of the display unit 14 (Step S9). The value stored in the cursor position storage register 18 is updated by a value corresponding to a sentence head position of a page displayed on the display unit (Step S10). Accordingly, a cursor is displayed at a sentence head of the document data displayed on the display screen (Step S11).

Thus, the cursor position moving operation among the pages of the document data formed by plural pages has been accomplished. Thereafter, the cursor is moved within this page to a position of the specific document data.

In case that headlines of all pages cannot be displayed in a single display operation due to a high volume, for instance, document data are subdivided into blocks each having a preselected page number by which each block can be displayed. Alternatively, if the page of the document data being displayed on the screen exceeds the allowable page range when the cursor is moved, both the page number and headlines of the sentence head are scrolled every one page.

As a consequence, to call such a page that specific data has been held, from the data which has been inputted by plural pages, both headlines of the respective pages and page numbers are displayed with all pages or a part of the entire pages within one display screen.

The confirmation is made from the above-described headlines as to such a page that the specific data is present and this page is selected by the cursor, so that the cursor may be moved to the specific page where the specific data is present. As a consequence, when the inputted document data is edited, the page where the specific data is present may be confirmed and the cursor may be readily and quickly moved to the head of the confirmed page.

OTHER DOCUMENT LISTS

Figure 4:
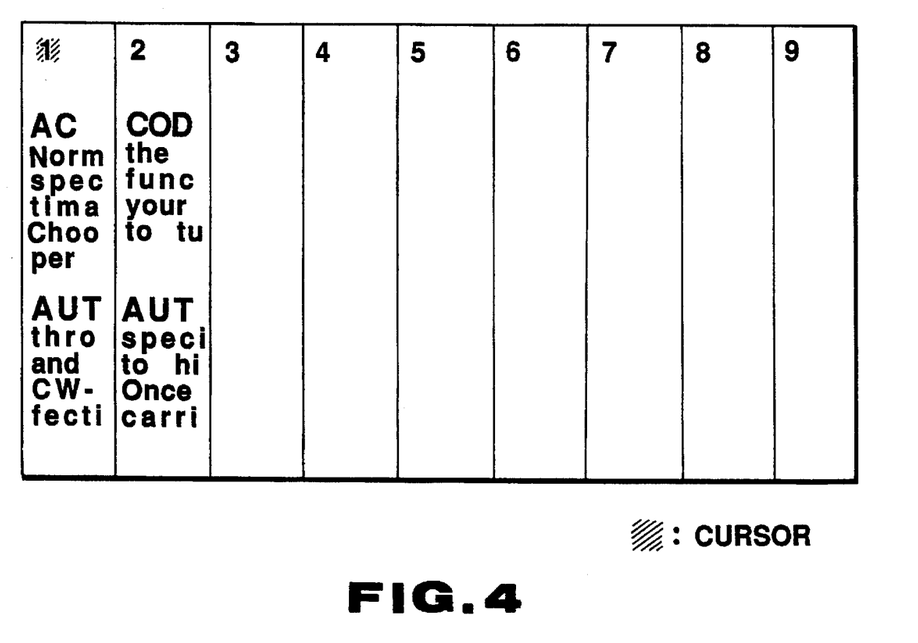
FIGS. 4 to 8 illustrate other display examples for lists of documents according to the first preferred embodiment.

Other document lists according to the data processing apparatus of the first preferred embodiment will now be described with reference to FIGS. 4 to 8. In FIG. 4, there is shown such a representation that serial columns from the leftmost column of each page are displayed as information indicative of a content of the respective pages while a list of document is displayed. With such a document list representation, the contents of the respective pages may be readily grasped. It should be noted that movement of a cursor must be performed by manipulating keys for moving the cursor in either right or left direction in this example shown in FIG. 4, and therefore such keys are further required in the key entry unit 15 shown in FIG. 1.

Figure 5:
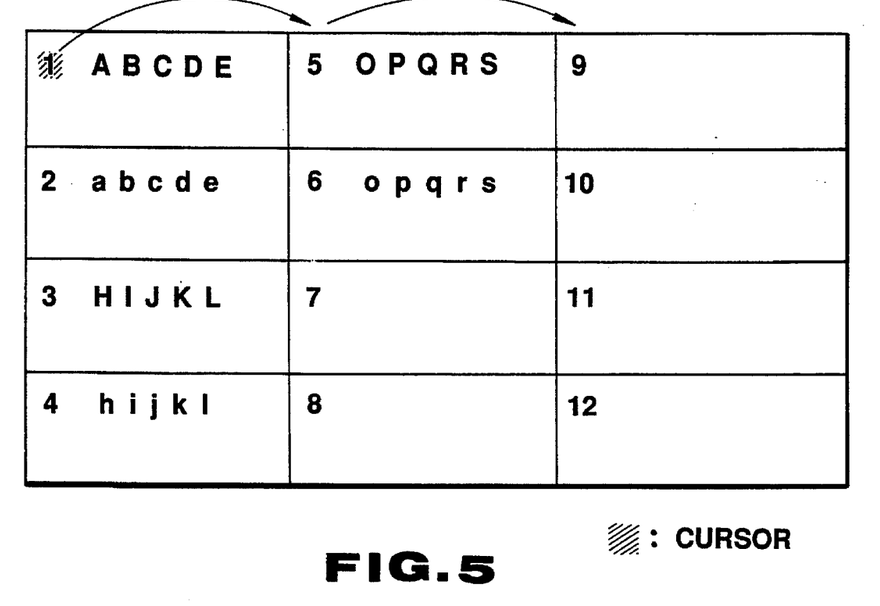

As a third document list, FIG. 5 shows that a headline indicative of a content of each page is subdivided into plural lines. There is a particular advantage of the third document list representation. As shown by arrows of FIG. 5, a key operation for moving the cursor from a first page to a fifth page is required only one time. That is, the key for moving the cursor in the right direction may be manipulated just one time. Accordingly, since the cursor may be moved over plural pages by operating the key only one time, a cursor movement to a desired page may be quickly achieved.

Figure 6:
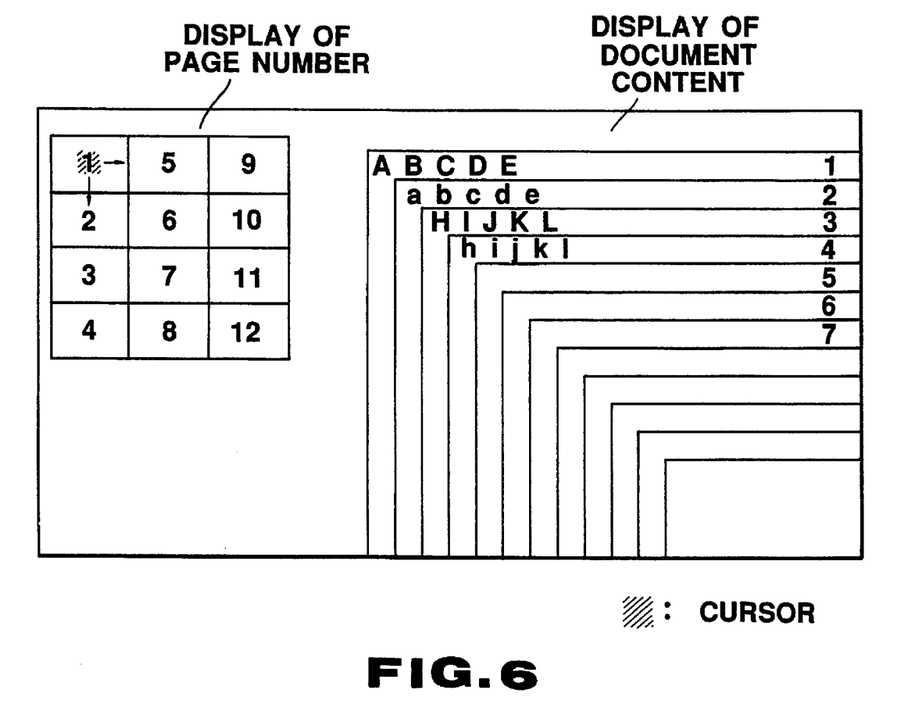

FIG. 6 represents another example where both a list of document and a page number display section for designating a page by moving a cursor are represented.

Figure 7:
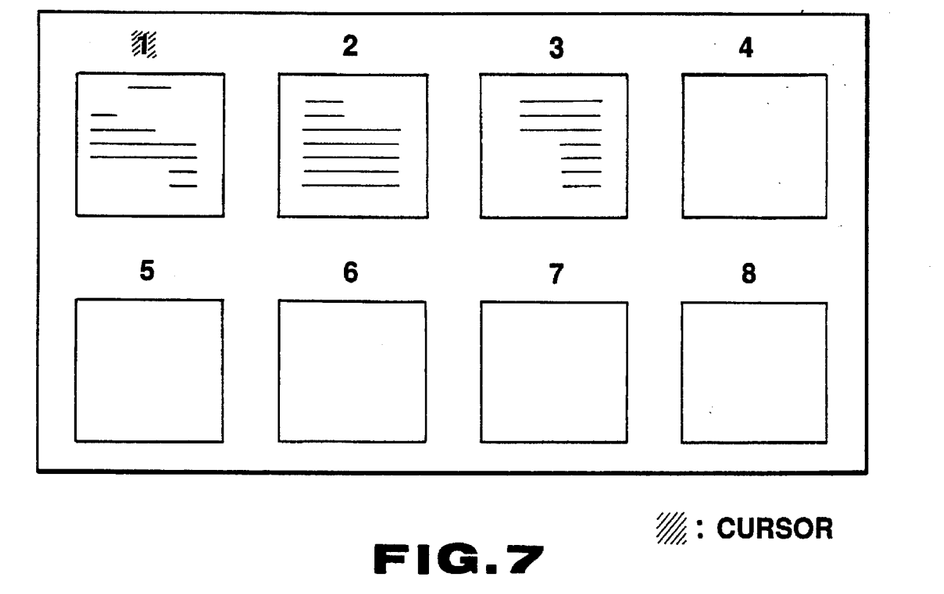
Figure 8:
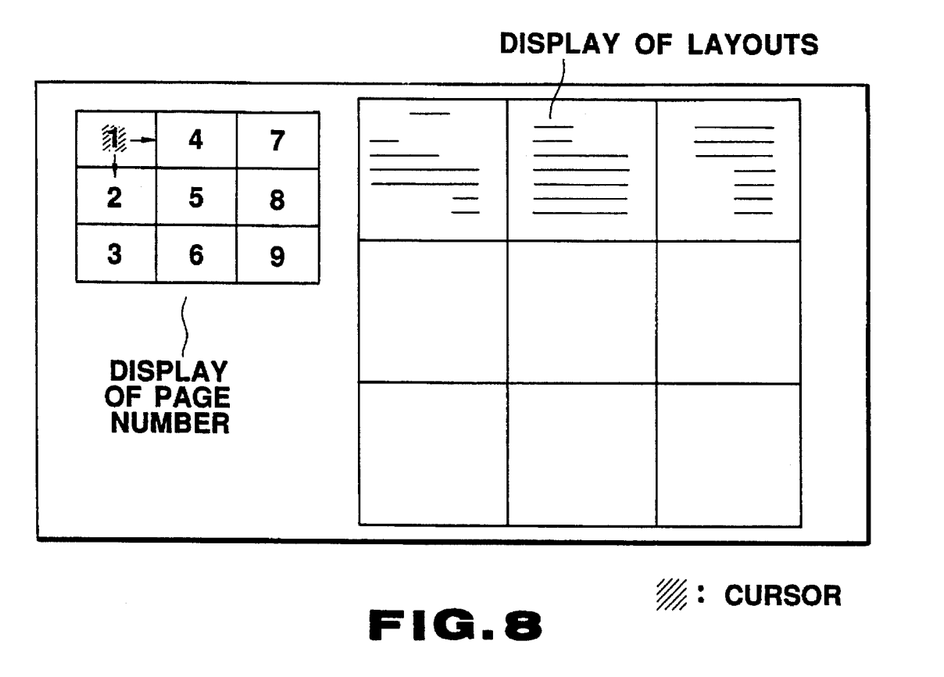

FIGS. 7 and 8 are further display examples in which layouts of the respective pages are displayed as document list displays.

The operation of a data processing apparatus according to a second preferred embodiment of the present invention will now be described with reference to FIGS. 9 and 10. It should be noted that since Steps A4 through A12 shown in a flow chart of FIG. 9 correspond to the Steps S3 to S11 of the flow chart shown in FIG. 2 used for explaining the operation of the data processing apparatus, no further explanation thereof is made in the following description.

Figure 9:
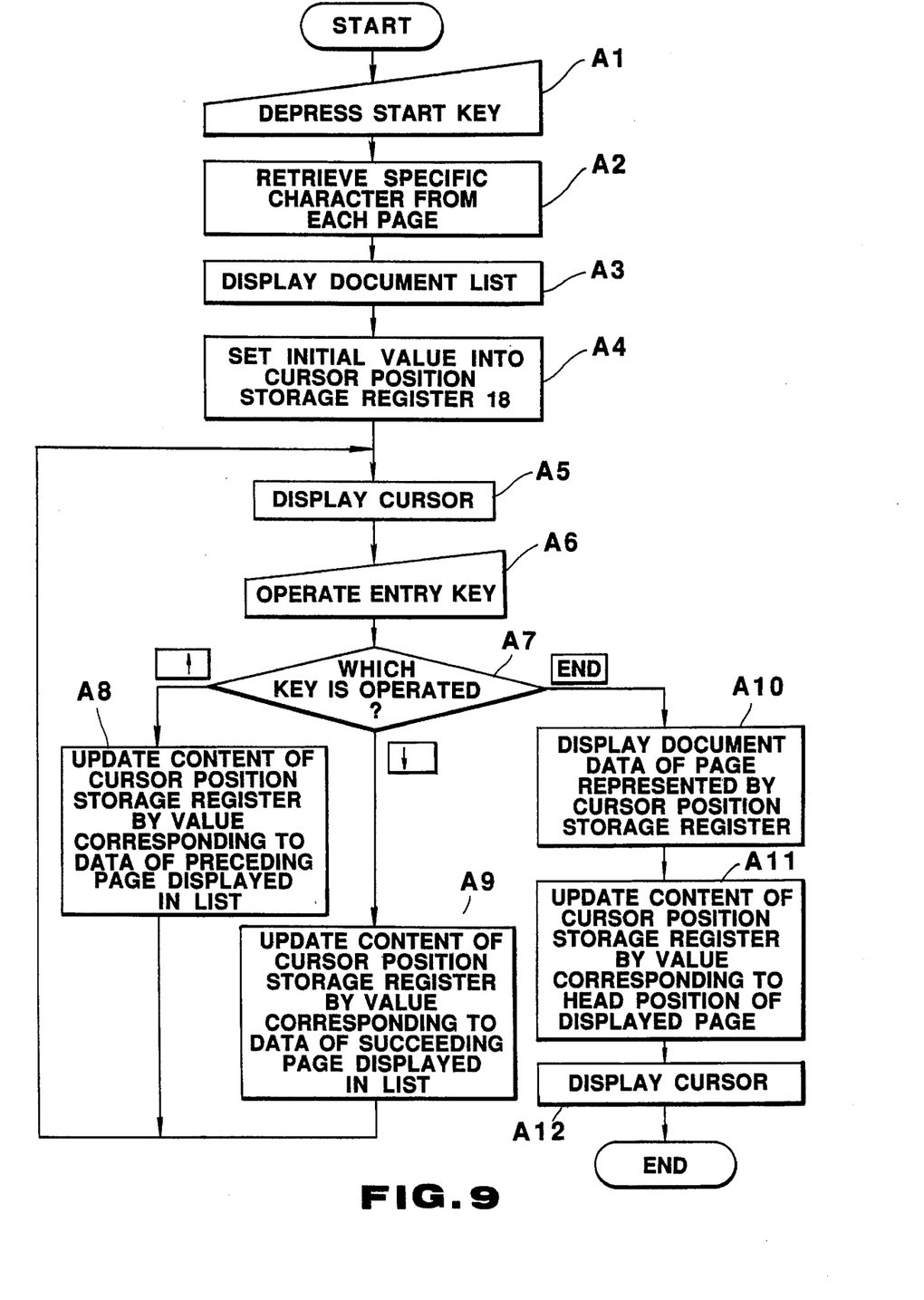
FIG. 9 is a flow chart for explaining operations of a data processing apparatus according to a second preferred embodiment of the present invention.
Figure 10:
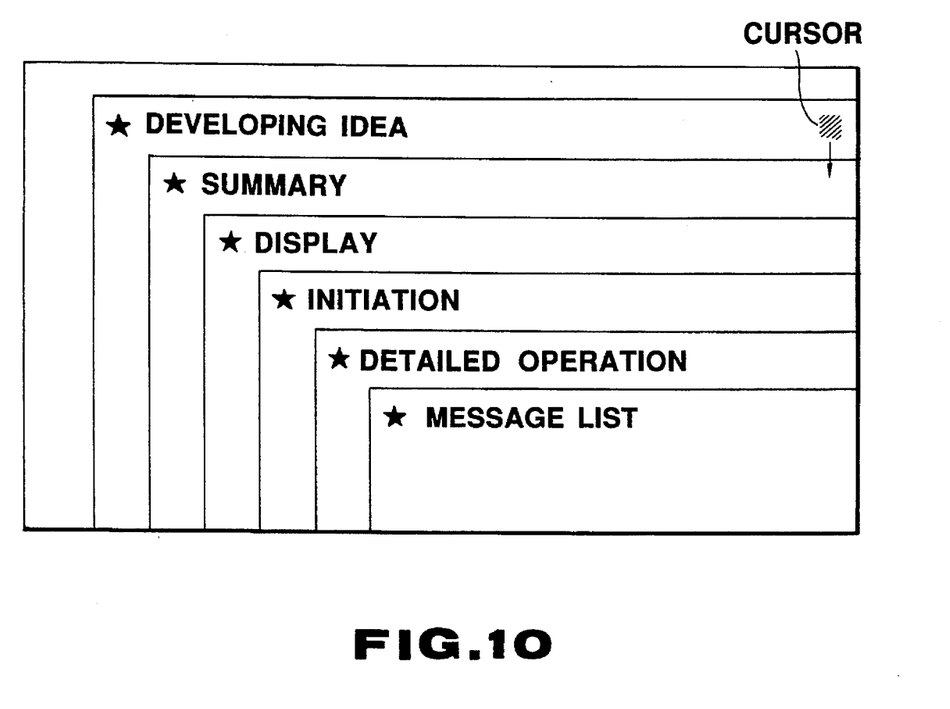
FIG. 10 illustrates a display sample of a list of document according to the second preferred embodiment.

In the flow chart shown in FIG. 9, before a document list is displayed on the display unit 14, an user enters a specific character such as ★ in front of a character column which may represent a content of each page with best conditions as a preparating operation. Thereafter, when the start key is operated (Step A1), a specific character such as ★ is retrieved (Step A2) and then both this specific character and a character series succeeding to the specific character are displayed in the document list as headlines of the respective character series (Step A3). In FIG. 10, there is shown an example of a document list according to the second preferred embodiment of the present invention. In this document list, a user inputs the specific character in front of a character series "developing idea" at a first page prior to a document list representating; further inputs the specific character in front of another character series "summary" at a second page; and subsequently enters the specific characters in front of the respective character series "initiation", "detailed operation" and "message list" at each of pages. When the above-described document list representation according to the second preferred embodiment is carried out, every user may correctly grasp the contents of the respective pages and the cursor may be rapidly moved on the display screen. It should be understood that the data on the specific character is merely displayed on the display screen of the display unit 14 and such a specific character is not printed out while the document is printed.

Although the designation of the character series functioning as the headlines of the respective pages was performed by inputting the above-described specific character when the document list was displayed, there are alternatively many possibilities, for instance, an underline may be made to a character series functioning as a headline.

Furthermore, the designation of the character series as the headline is not only performed every one page, but also may be realized in such a manner that document data constructed of plural pages is properly subdivided in plural blocks and a character series representative of a content of each subdivided block is designated as headline data. In the latter case, the designated headline data are displayed as a document list for each block. When an operator designates any of the headline data which have been displayed as the document list, the block data containing the designated headline data are displayed from the head data on the display unit 14.

What is claimed is:

1. In a data processing apparatus which is provided with a memory for storing document data including plural page data and display means for displaying the document data stored in said memory, a graphical user interface for editing the stored document data comprising:

means for displaying an image of a plurality of graphical representations each representing a page data;

means for displaying on the same image with said plurality of graphical represenations a graphical representation of a page designation means for designating one of said page data together with a cursor;

means for moving the cursor within said graphical representation of the page designation means to designate an index representative of desired page data;

means for reading out from said memory the page data corresponding to the index designated with the cursor; and means for displaying the read out page data on said display means.

2. The graphical user interface according to claim 1, wherein said graphical representation of a page designation means includes a list of page numbers for selection of a desired page, which page numbers are representative of page data stored in said memory.

3. In a data processing apparatus which is provided with a memory for storing document data including plural page data, and display means for displaying the document data stored in said memory, a graphical user interface for editing the stored document data, comprising:

(a) means for designating a particular portion of each page data of the document data as headline data of said page data;

(b) means for retrieving from said memory the designated headline data of the plural page data of the document data;

(c) means for displaying an image of a plurality of graphical representations each representing a page data, each of said page data representations includes said respective headline data together with a page number;

(d) means for displaying on the same image with said plurality of graphical representations a graphical representation of a page designation means for designating one of said page data, together with a cursor;

(e) means for moving said cursor within said graphical representations of the page designation means to designate a page for editing;

(f) means for reading out from said memory the page data corresponding to the designated page;

(g) means for displaying the read out page data; and (h) means for moving the cursor within the read out page data to edit the page data.

4. The graphical user interface according to claim 3, wherein said means for designating comprises:

means for selecting a particular portion of each page data of the document data; and means for entering a specific character at the head of the selected particular portion of each page data of the document data to designate the selected particular portion as headline data of the page data, 5. The graphical user interface according to claim 3, wherein said means for designating comprises:

means for selecting a particular portion of each page data of the document data; and means for placing an underline under the selected particular portion of each page data of the document data to designate the selected particular portion as headline data of the page data.

* * * * *